(No Model.)  2 Sheets—Sheet 1.

J. GARFIELD.
HAY TEDDER.

No. 309,779. Patented Dec. 23, 1884.

ATTEST.
Pembroke S. Rich.
George E. Bent.

INVENTOR.
Joel Garfield.

(No Model.)
J. GARFIELD.
HAY TEDDER.
No. 309,779. Patented Dec. 23, 1884.
FIG. 3.
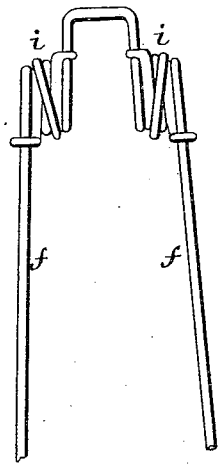
FIG. 4.
FIG. 5.
FIG. 7.
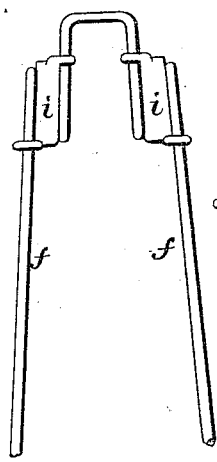
FIG. 6.
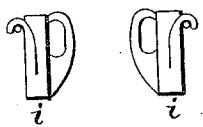
FIG. 8.
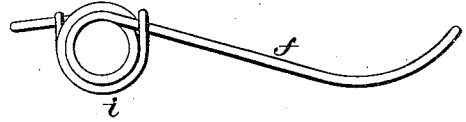
FIG. 9.
FIG. 10.
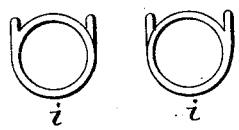
ATTEST.
Pembroke S. Rich.
George E. Bent.
INVENTOR.
Joel Garfield.

UNITED STATES PATENT OFFICE.

JOEL GARFIELD, OF WORCESTER, MASSACHUSETTS.

HAY-TEDDER.

SPECIFICATION forming part of Letters Patent No. 309,779, dated December 23, 1884.

Application filed August 25, 1883. (No model.)

*To all whom it may concern:*

Be it known that I, JOEL GARFIELD, of Worcester, in the county of Worcester and State of Massachusetts, have invented a new and useful Improvement in Hay-Tedders or Hay-Spreading Machines, of which the following is a specification.

The nature of my invention consists, first, in so constructing the forks and the revolving reel that the reel-bars act as strippers to effectually strip off all the hay from the forks as they fall back within the periphery of the reel, and in constructing and applying an independent guard or clasp to hold the fork in its exact position while operating on the hay, but leaving it free to spring backward in passing over any obstruction.

Heretofore the forks in hay-tedders have been constructed with a substantially-uniform curvature distributed nearly equally over their entire length, making the arm of the fork which operates upon the hay nearly the arc of a circle. The objection to such forks is that they strike the hay bodily, tending to drag the hay backward upon the ground instead of lifting the hay at once from the ground, thus requiring more power to propel the machine, and such forks, having once entered the hay, are not so easily withdrawn, and the reel-bars cannot be made to act as strippers.

Figure 1:
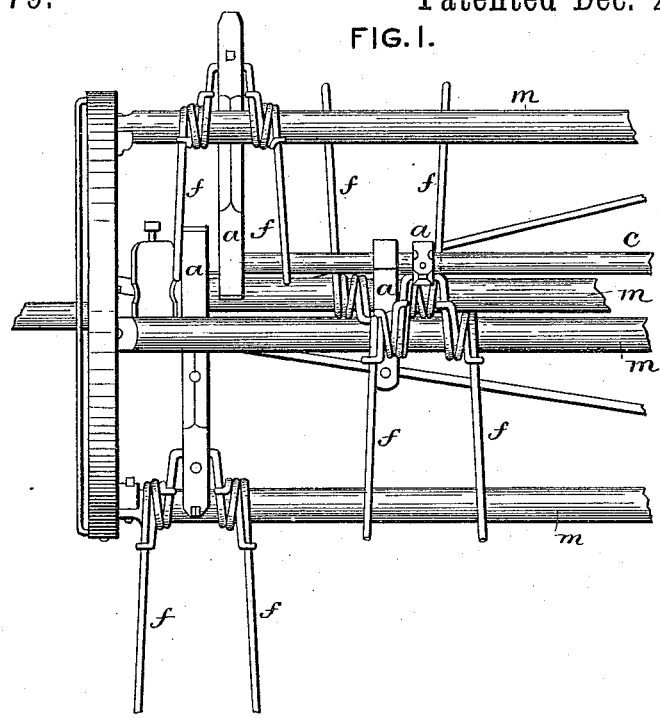
Figure 2:
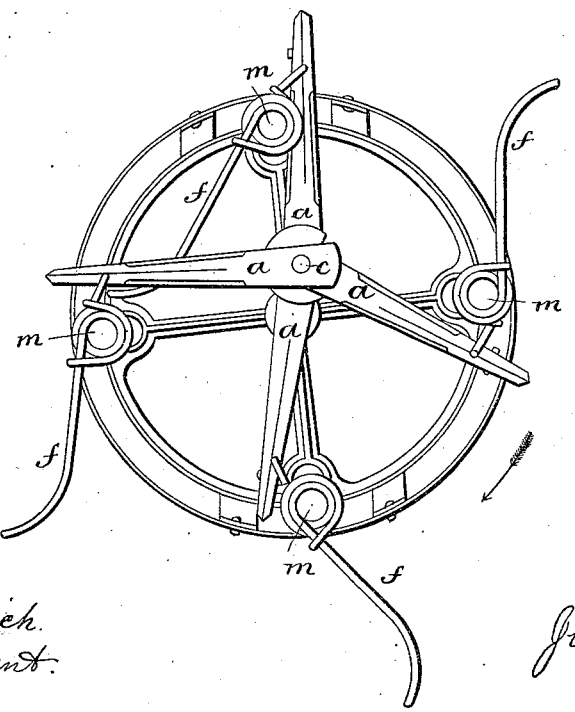

In the accompanying drawings, in which similar letters of reference indicate like parts, Figure 1 is a rear view of a portion of the revolving reel of my improved hay-tedder, showing the position of four of the forks. Fig. 2 is a side view of the same. Fig. 3 is a front view of a detached fork having spiral guards or clasps *i* attached to hold the fork in its true position. Fig. 4 is a side view of the same. Fig. 5 shows detached front views of the spiral guard *i*. Fig. 6 shows side views of the same. Fig. 7 is a front view of a detached fork having ring or ferrule guards to hold the fork in position. Fig. 8 is a side view of the same. Fig. 9 shows detached front views of the ring or ferrule guards, and Fig. 10 shows side views of the same.

I construct the revolving reel with an eccentric shaft, *c*, rocking forks *f f*, connecting-arms *a a*, and reel-bars *m m*, all connected and operated substantially as illustrated in my former United States Patent No. 64,518, dated May 7, 1867. In my improved machine, however, I construct the arm of the fork which works upon the hay substantially straight for about two-thirds of its length from the spiral coil that encircles the reel-bars. In the outer portion of the fork I give the working-arm of the fork its entire curve, throwing the point forward sharply, so as to more readily dip under and lift the hay. (See Figs. 2, 4, and 8.) The forks *f f* are also constructed to fall back wholly within the periphery of the reel. (See Fig. 2.) The reel-bars *m m* thus form strippers to strip the hay off of the forks as they are drawn back within the periphery of the reel, and the sharply-curved end of the forks allow the hay to be easily stripped therefrom by the reel-arms. I also construct a guard or clasp, *i*, of a diameter sufficient to embrace the coil of the fork. One end of the guard grasps the shank of the fork back of the coil, and the other end is constructed with a slot or loop to grasp the long or working arm of the fork. I construct these guards *i i* either of a spiral wire (see Figs. 3, 4, 5, and 6) or of a ferrule or thimble provided with projections to grasp both the shank and working end of the forks. (See Figs. 7, 8, 9, and 10.)

The forks *f f*, constructed as shown and described, revolve with the reel when the machine is put in operation, and have an accelerated and retarded motion communicated to them by the arms *a*, connecting them with the eccentric shaft, as fully described in my former patent hereinbefore referred to. The curved points of the forks *f f* enter the hay and lift it from the ground, tossing the hay upward and rearward by the accelerated motion of the forks. The forks tend to free or clear themselves from the hay by their retarded motion on the rear side of the reel. The reel-bars *m m*, acting as strippers over the curved points of the forks, assist in removing the hay from the forks as the latter are drawn back within the periphery of the reel. The curve of the forks is such that any hay that adheres thereto is readily stripped off by the reel-bars as the ends of the forks are drawn back over them. The forks *f f* are constructed with a spring-coil surrounding the bar *m* of the reel. This spring-coil is required to give the desired elasticity to the fork to allow it to yield in passing obstructions. The centrifugal force of the revolving forks and the play caused by the wearing of the parts tend to throw the points of the forks outward from the center as the eccentric shaft rocks the forks backward on the rear of the reel, thereby lessening the desired retarded action of the forks as they are withdrawn from the hay. To prevent this loss of the retarded motion and to hold the fork more perfectly in its true position, I apply the guard-clasps $i$. The fork $f$ is bent backward slightly from the position in which the coil would naturally hold it, and the guard is sprung over the long arm and the shank of the fork. Thus the fork is held firmly from rocking forward too far, and is held in position to operate upon the hay with sufficient tension to resist the ordinary resistance of the hay. The slot in the shell-ferrule $i$ or the loop on the spiral guard allows the fork to spring back freely when subjected to any unusual strain, but holds it from being thrown forward by centrifugal force or by its rebound after passing an obstacle. The guards $i$ also tend to hold the forks more perfectly in position while they act upon the hay. When the fork is sprung backward in passing any unusual obstacle, it will spring forward again after being released. Without the guard $i$, the coil and working-arm of the fork might be bent out of place by the rebound of the fork. With this improved guard the fork will always return to its true position, which is essential to the successful operation of the machine.

Having thus described the construction and operation of my improved hay-tedder, what I claim as new, and desire to secure by Letters Patent, is—

1. The combination, in a hay-tedder, of the revolving reel, the reel-bars, the forks carried by said bars, and means for oscillating said forks, the whole constructed and arranged in such a manner that each bar will act as a stripper for the fork on the preceding bar, substantially as described.

2. The combination, in a hay-tedder, of the revolving reel, the reel-bars $m\ m$, the forwardly-curved forks $f\ f$, pivoted on said bars, means for oscillating said forks to project them as the reel revolves and to withdraw them within the periphery of the reel as the forks ascend, the whole constructed and arranged in such a manner that the ends of the ascending forks will pass near the succeeding reel-bar, which bar will act as a stripper to remove the hay from the forks, substantially as and for the purpose described.

3. The combination, in a hay-tedder, of the revolving reel, the eccentric shaft $c$, the reel-bars $m$, the forks $f$, pivoted upon the reel-bar, the arm $a$, connecting the shank of the fork with the eccentric shaft, and the auxiliary clasp or tie $i$, extending from the shank to the body or working-arm of the fork $f$, whereby the fork is free to spring backward when it meets with any unusual obstruction in raising the hay, but it is prevented from being thrown outward by centrifugal force or the action of the hay as the fork is rocked backward, substantially as and for the purpose described.

JOEL GARFIELD.

Witnesses:
PEMBROKE S. RICH,
GEORGE E. BURT.